(12) United States Patent
Wang

(10) Patent No.: US 6,501,902 B1
(45) Date of Patent: Dec. 31, 2002

(54) METHOD FOR BROWSING AND REPLAYING A SELECTED PICTURE BY A MULTIMEDIA PLAYER

(75) Inventor: Hung-Min Wang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/238,364

(22) Filed: Jan. 27, 1999

(30) Foreign Application Priority Data

Aug. 10, 1998 (TW) ........................................ 87113137 A

(51) Int. Cl.[7] .............................. H04N 5/93; H04N 5/91
(52) U.S. Cl. ................................ 386/52; 386/55; 386/46
(58) Field of Search ........................ 386/52, 55, 46–68, 386/69, 70, 4, 6, 27, 33, 109, 111, 112, 125, 126; H04N 5/93, 5/91

(56) References Cited

U.S. PATENT DOCUMENTS 5,126,851 A  *  6/1992  Yoshimura et al.
5,568,275 A  *  10/1996  Norton et al.

* cited by examiner

*Primary Examiner*—Robert Chevalier
(74) *Attorney, Agent, or Firm*—Michael Best & Friedrich, LLC

(57) ABSTRACT

A method for browsing and replaying a selected picture by a multimedia player is disclosed. The method includes the steps of providing a display and an controlling interface, showing a plurality of subpictures corresponding to a plurality of fullscale pictures containing said selected picture on the display, selecting one of the subpictures corresponding to the selected picture by the controlling interface, and showing the selected picture on the display. The mutlimedia player includes a display, a pickup header for picking up an image data corresponding to the selected picture from a memory device, a servo connected to the pickup header for moving the pickup header to pick up the image data, a decoder electrically connected to the pickup header for decompressing the image data to generate a fullscale image, a zoom processor electrically connected to said decoder for converting said fullscale image to a subpicture, an image overlapping device electrically connected to the zoom processor for showing a plurality of the subpictures on the display, and a controlling interface for selecting one of the plurality of the subpictures corresponding to the selected picture to show the selected picture on the display. The user can easily distinguish the bookmark spots by a plurality of subpictures and correctly select a picture to replay.

6 Claims, 5 Drawing Sheets

Display

Bookmark Spots 1. 3 Min : 30 Sec   7. _ Min : _ Sec
2. 12 Min : 50 Sec  8. _ Min : _ Sec
3. 47 Min : 05 Sec  9. _ Min : _ Sec
4. _ Min : _ Sec    10. _ Min : _ Sec
5. _ Min : _ Sec
6. _ Min : _ Sec

Fig. 1(PRIOR ART)

METHOD FOR BROWSING AND REPLAYING A SELECTED PICTURE BY A MULTIMEDIA PLAYER

FIELD OF THE INVENTION

The present invention is related to a method for browsing and replaying a selected picture by a multimedia player, and more particularly to a method for browsing and replaying a selected picture by a multimedia player with a bookmark function.

BACKGROUND OF THE INVENTION

At the present time, a general VCD player has a special function of recording a picture in advance for being browsed or replayed. The function of the VCD player is named as bookmark and the recorded picture is called as a bookmark spot. When a user is watching a program, he can randomly set a bookmark spot as a starting point for being browsed or replayed. Then, he can select any one of the bookmark spots which he has set to be browsed or replayed by a VCD player.

The operation process of a general bookmark function includes the steps of:

1. Under a play mode, the user can turn it to a bookmark mode and the program will still be played at the same time;
2. When the program shows a picture which the user wants to mark, the user can press a memory key to memory the tune parameter of the bookmark spot in the VCD player; and
3. End the bookmark mode and return to the play mode.

The operation process of replaying a bookmark spot includes the steps of:

1. A browse-and-replay mode is selected under a stop mode, and then a list of bookmark numbers with corresponding time parameters will be shown on the display for a user to select; and
2. Operate the controlling interface such as a remote controller or a keyboard and press the number key of the controlling interface corresponding to the bookmark numbers to replay the selected picture.

The general way of showing a list of bookmark numbers with corresponding time parameters on the display is shown in FIG. 1. As shown in FIG. 1, there are three bookmark spots which have been recorded marked with bookmark numbers 1, 2, and 3 respectively. The other bookmark numbers 4, 5, 6, 7, 8, 9, and 10 have not been marked with any bookmark spot.

It is very inconvenient to replay a bookmark spot by the way of showing the time parameters to be selected, because too many sets of the time parameters will easily make the user confused. Moreover, the time parameters are not associated with the selected pictures so that the user can not easily remember the time parameters corresponding to the pictures which he wants to replay. The object of the present invention is to provide a method for improving the defects encountered by the prior arts and make selecting a bookmark spot to be replayed easier and simpler.

SUMMARY OF THE INVENTION

An object of the present invention is to provide a method for browsing and replaying a selected picture by a multimedia player. A display is provided for showing the pictures of the program and a controlling interface is provided for controlling the multimedia player. When the program shows a picture which the user wants to mark, the user can bookmark the picture as a bookmark spot by using the bookmark function of the multimedia player. Thereafter, when the user wants to replay the selected picture, the multimedia player will show a plurality of subpictures corresponding to a plurality of fullscale pictures containing the selected picture on the display for the user to select. The user can select by the controlling interface one of the subpictures corresponding to the selected picture to be replayed, and then the selected picture will be shown on the display. By the method of the present invention, the user can easily distinguish the bookmark spots with corresponding subpictures instead of the bookmark spots with corresponding time parameters, and can correctly select a picture to replay.

In accordance with one aspect of the present invention, the controlling interface is a remote controller or a keyboard. The storage device is a video compact disc (VCD) title, super video compact disc (SVCD) title, a china video disc (CVD) title or a digital versatile disc (DVD) title. The image data is a motion picture expert group (MPEG) image data.

Among these steps, the step of showing the subpictures on the display further includes steps of picking up an image data from a storage device, decompressing the image data to generate a fullscale image, converting the fullscale image to one of the subpictures, and showing the one subpicture on the display. Moreover, the step of showing one subpicture on the display further includes a step of marking the subpicture with a bookmark number by way of on screen display (OSD), wherein each of the subpictures is represented by the corresponding bookmark number. The bookmark number is provided for selecting one subpicture by the controlling interface. The maximum number of the subpictures contained in one page on the display is n. There is a second page for selecting the one subpicture by pageup/pagedown when a count of the subpictures is more than n.

The step of showing the selected picture on the display further includes steps of picking up an image data from a storage device according to a selected bookmark number, decompressing the image data, and scanning the decompressing data to show the selected picture on the display.

Another object of the present invention is to provide a multimedia player adapted to be used to browse and replay a selected picture. The multimedia player includes a display, a pickup header for picking tip an image data corresponding to the selected picture from a storage device, a servo connected to the pickup header for moving the pickup header to pick up the image data, a decoder electrically connected to the pickup header for decompressing the image data to generate a fullscale image, a zoom processor electrically connected to the decoder for converting the fullscale image to a subpicture, an image overlapping device electrically connected to the zoom processor for showing a plurality of the subpictures on the display, and a controlling interface for selecting one of the plurality of the subpictures corresponding to the selected picture to show the selected picture on the display. The decoder is a MPEG decoder.

The multimedia player further includes a memory electrically connected to the image overlapping device and decoder for recording a plurality of small-scale images, corresponding to the plurality of the subpictures, obtained from the image overlapping device in a first instance, and recording the fullscale image, corresponding to the selected picture, obtained from the decoder in a second instance.

The multimedia player further includes a video scanner electrically connected to the memory for converting the plurality of small-scale images to the plurality of the subpictures to be shown on the display in the first instance, and converting the fullscale image to the selected picture to be shown on the display in the second instance. The multimedia player further includes an on screen display controller for marking the plurality of the subpictures with a plurality of bookmark numbers respectively by way of on screen display.

The present invention may best be understood through the following description with reference to the accompanying drawings, in which:

BRIEF DESCRIPTION OF THE DRAWINGS

FIG. 1 is a schematic diagram showing a general bookmark mode;

DETAILED DESCRIPTION OF THE PREFERRED EMBODIMENTS

Figure 2:
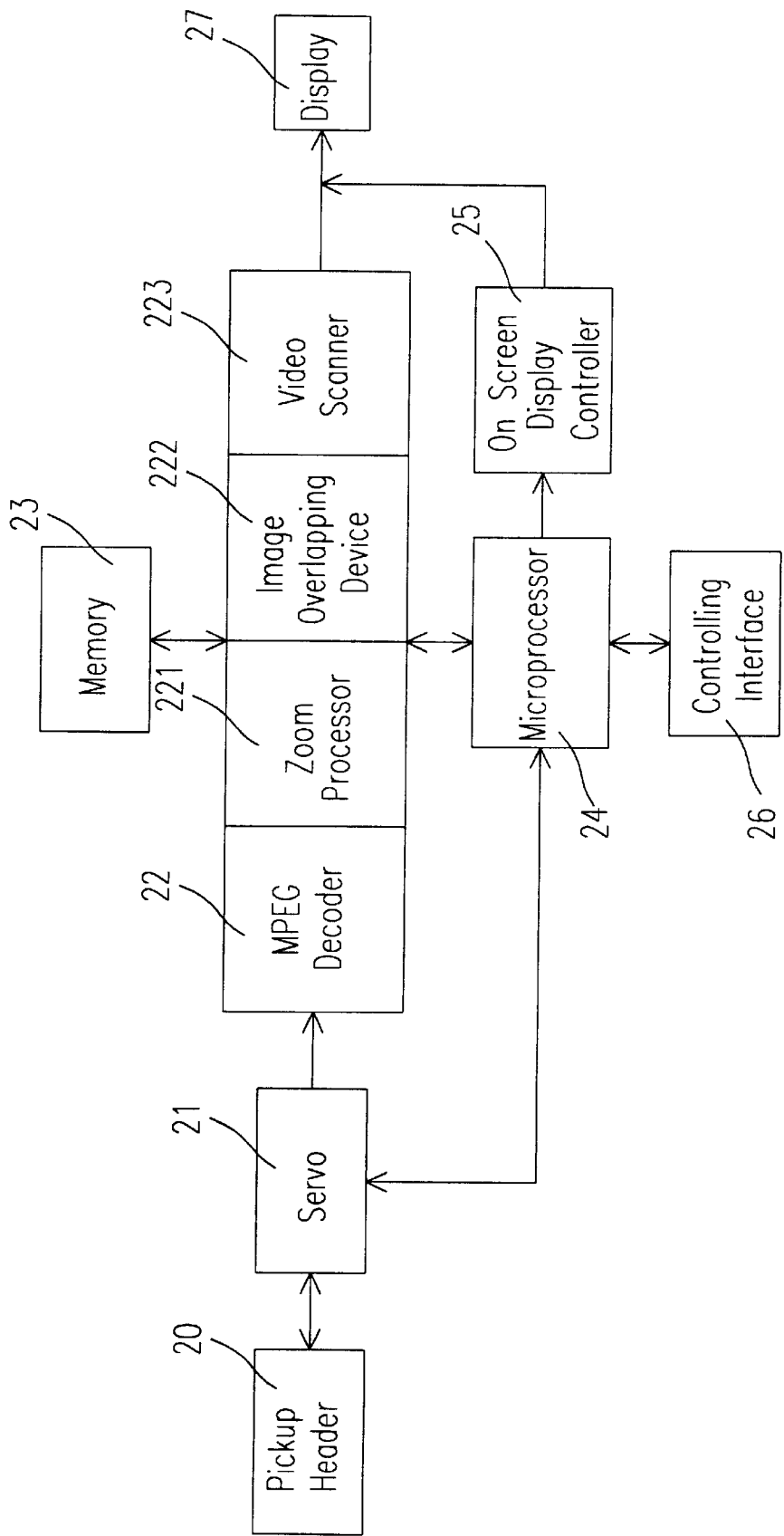
FIG. 2 is a schematic diagram showing a preferred embodiment of a multimedia player according to the present invention.

Please refer to FIG. 2 showing a preferred embodiment of a multimedia player according to the present invention. The VCD player has a pickup header 20 for picking up an image data from a VCD title under a play mode. A microprocessor 24 will control a servo 21 to move the pickup header 20 to pick up an image data. The image data can be transmitted to a MPEG decoder 22 for being decompressed to generate a fullscale image and then saved in a memory 23. A video scanner 223 will scan the decompressed image which is stored in the memory 23 to show a picture on the display 27.

Under a bookmark mode, the microprocessor 24 will control the servo 21 to move the pickup header 20 to pick up the image data corresponding to the bookmark spots from the VCD title. The image data will be decompressed to generate a plurality of fullscale images by a MPEG decoder 22. Then a zoom processor 221 which is electrically connected to the MPEG decoder 22 will convert the plurality of fullscale images to a plurality of subpictures. An image overlapping device 222 electrically connected to the zoom processor 221 will show a plurality of the subpictures on the display 27 and then save a plurality of small-scale images corresponding to the plurality of subpictures in a memory 23. Under a browse-and-replay mode, the video scanner 223 will scan the plurality of small-scale images stored in the memory 23 and then these images are converted to the plurality of subpictures to be shown on the display 27. At the same time, the on screen display controller 25 marks the plurality of subpictures with a plurality of bookmark numbers respectively by on screen display for a user to select a subpicture corresponding to the selected picture to be replayed.

For most people, the ability of distinguishing pictures is superior to that of numbers and they need not to think before they selects a picture to replay. So, it is more convenient to replay a selected picture by showing a plurality of subpictures corresponding to the fullscale pictures on the display.

The bookmark process of the present invention is not modified greatly, and the most important concept of the present invention is to show a plurality of subpictures corresponding to the fullscale pictures on the display for being selected to replay or browse. That is to say that a list of bookmark numbers with corresponding time parameters will be changed into a plurality of subpictures corresponding to the plurality of fullscale pictures containing a selected picture for a user to select.

The operation process is detailedly described as follows:

1. Under a browse-and-replay mode, the microprocessor 24 will control the servo 21 to move the pickup header 20 to pick up the MPEG bit stream corresponding to the bookmark spots.
2. After the MPEG bit stream is transmitted to the MPEG decoder 22, the MPEG bit stream can be decoded to a plurality of fullscale images.
3. Then, the fullscale images will be transmitted to the zoom processor 221 for being converted to a plurality of subpictures.
4. The plurality of subpictures can be shown on the display 27 by an image overlapping device 222, and a plurality of small-scale images corresponding to the plurality of subpictures can be saved in the memory 23 for being scanned by a video scanner 223 to be shown on the display 27.
5. At the same time, the on screen display controller 25 will mark the plurality of the subpictures with a plurality of bookmark numbers respectively by on screen display.
6. The microprocessor 24 will execute a command received from a controlling interface 26 to replay a selected picture represented by a bookmark number or execute pageup/pagedown. If the command received by the microprocessor 24 is to execute pageup/pagedown, the microprocessor 24 will control the servo 21 to move the pickup header 20 to pick up a new bit stream and repeat all steps to show a plurality of the subpictures in the second page on the display. When a bookmark number is input by the controlling interface 26, the microprocessor 24 will control the servo 21 to move the pickup header 20 to pick up a plurality of the bit stream corresponding to the selected picture to replay the selected picture on the display 27.

Figure 3:
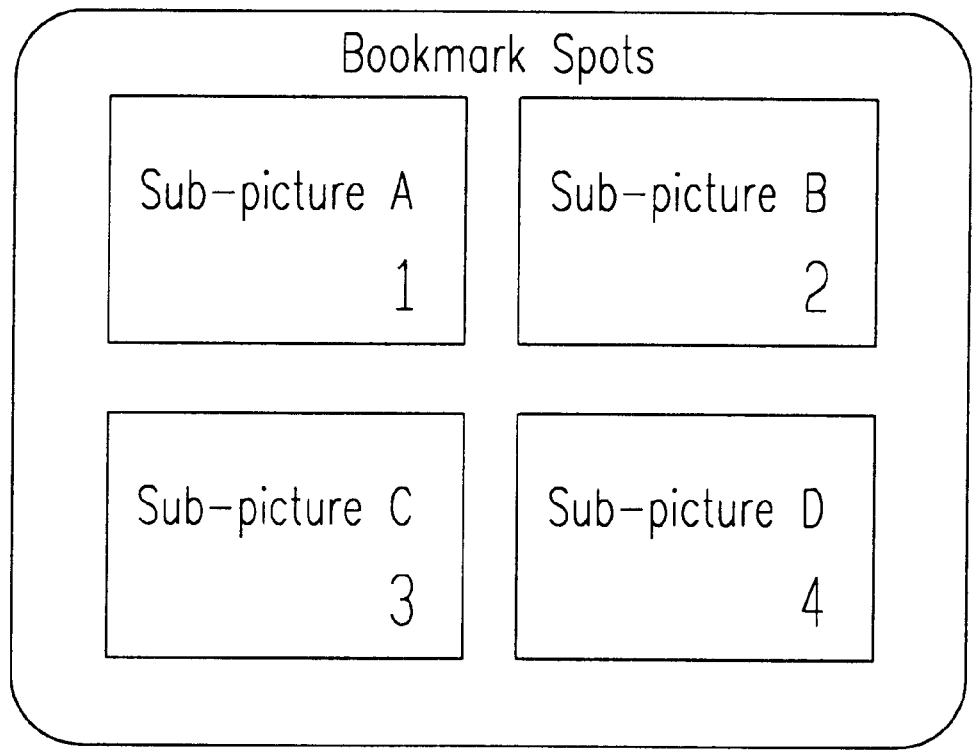
FIG. 3 is a schematic diagram showing four subpictures contained in one page on the display of the preferred embodiment of the present invention.
Figure 4:
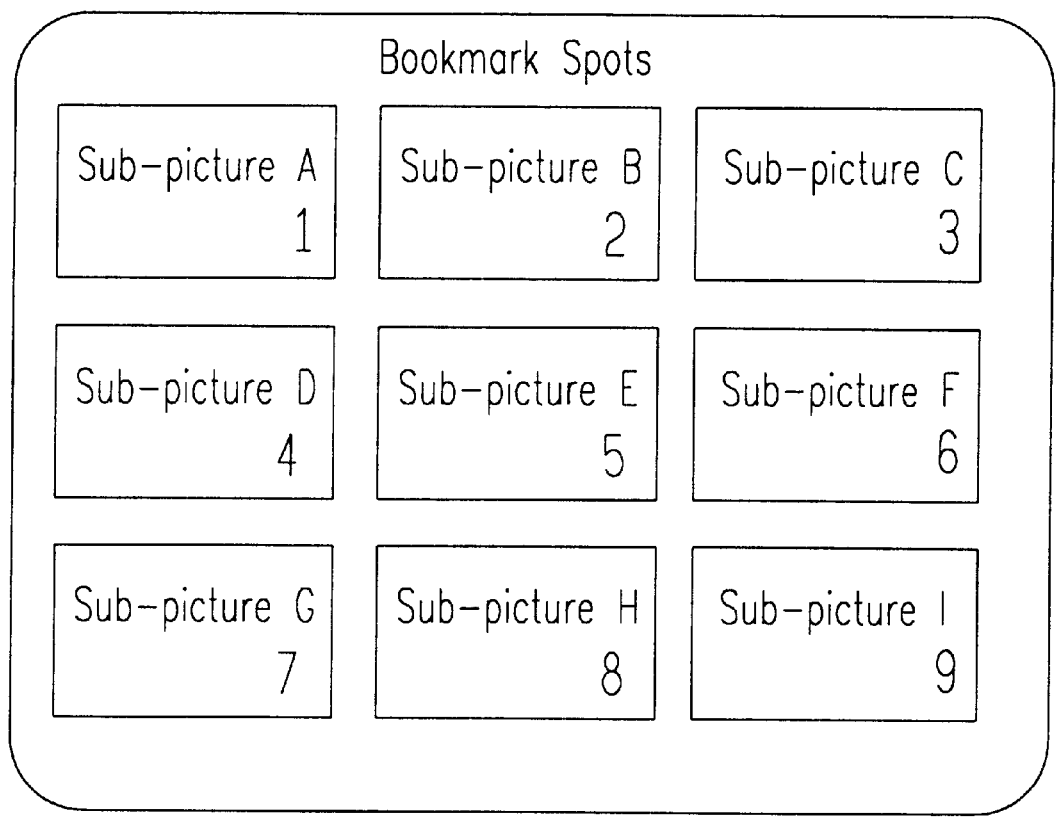
FIG. 4 is a schematic diagram showing nine subpictures contained in one page on the display of a preferred embodiment of the present invention.

FIGS. 3 and 4 respectively show a probable maximum number of the subpictures shown in a page on the display. Please refer to FIG. 3 showing a maximum number of the subpictures contained in one page on the display is 4. The four subpictures A, B, C, and D corresponding to four different bookmark spots are marked with four different bookmark numbers respectively. Those subpictures are small pictures corresponding to those fullscale pictures, so it is very convenient for a user to select a picture to be replayed by the VCD player. The bookmark numbers 1, 2, 3, and 4 are marked with the subpictures by on screen display for a user to select a subpicture corresponding to the fullscale picture to be replayed by a controlling interface 26. The controlling interface 26 can be a remote controller or a keyboard.

Figure 5:
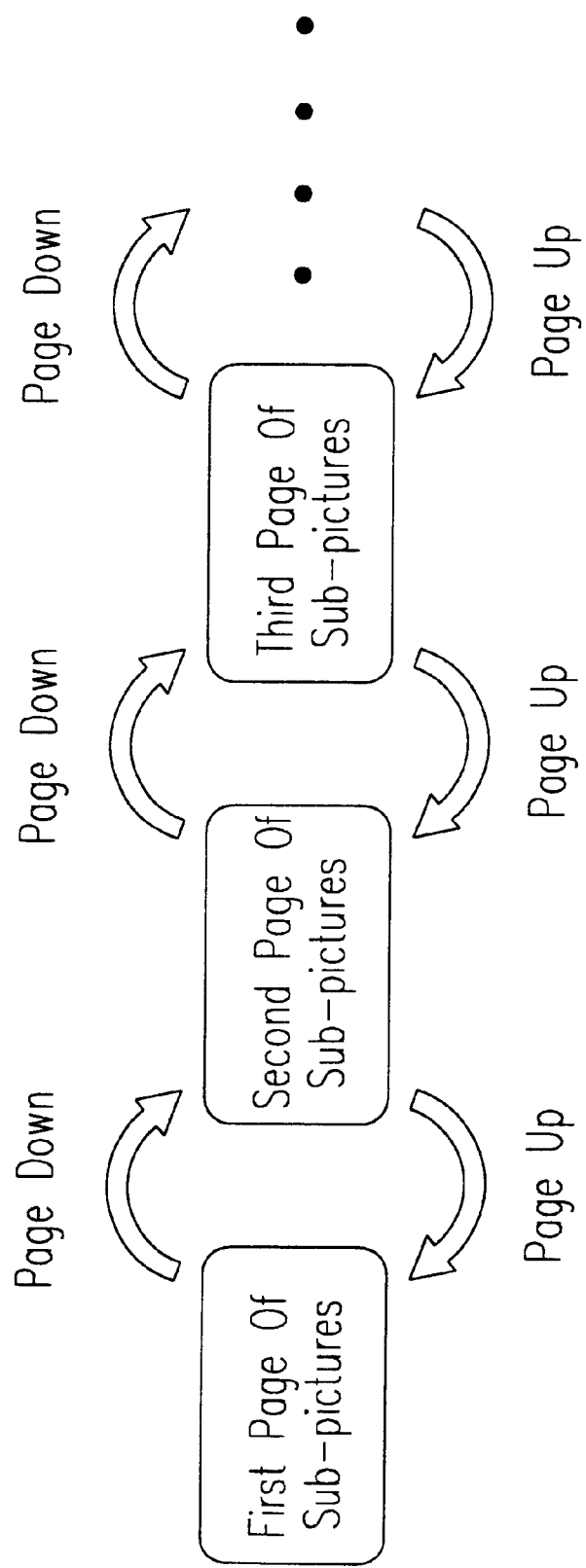
FIG. 5 is a schematic diagram showing several pages for selecting the subpictures of the preferred embodiment of the present invention.

Please refer to FIG. 5. There is a second page for selecting the subpictures by pageup/pagedown when a count of the subpictures is more than the maximum number of the subpictures which can be contained in one page on the display.

The bookmark spots can also be programmed to be replayed. The function of the present invention is clearly different from that of a karaokay player. For an example, if there are 12 songs in a video compact disk title, the user can only program the 12 songs to be replayed by the karaokay player. The VCD player of the present invention can randomly set and program bookmark spots from the video compact disk title to be replayed.

In accordance with the above-described method and device, the user can easily distinguish the bookmark spots by a plurality of subpictures and correctly select a picture to replay.

The above embodiments can be modified by any skillful person in the art without departing the spirit and scope of the accompanying claims.

What is claimed is:

1. A multimedia player adapted to be used to browse and replay a selected picture comprising:

a display;

a pickup header for picking up an image data corresponding to said selected picture from a storage device;

a servo connected to said pickup header for moving said pickup header to pick up said image data;

a decoder electrically connected to said pickup header for decompressing said image data to generate a fullscale image;

a zoom processor electrically connected to said decoder for converting said fullscale image to a subpicture;

an image overlapping device electrically connected to said zoom processor for showing a plurality of said subpictures on said display;

a memory electrically connected to said image overlapping device and decoder for recording a plurality of small-scale images, corresponding to said plurality of said subpictures, obtained from said image overlapping device in a first instance, and recording said fullscale image, corresponding to said selected picture, obtained from said decoder in a second instance;

a controlling interface for selecting one of said plurality of said subpictures corresponding to said selected picture to show said selected picture on said display.

2. The multimedia player according to claim 1 wherein said multimedia player further includes a video scanner electrically connected to said memory for converting said plurality of small-scale images to said plurality of said subpictures to be shown on said display in said first instance, and converting said fullscale image to said selected picture to be shown on said display in said second instance.

3. The multimedia player according to claim 1 wherein said multimedia player further includes an on screen display controller for marking said plurality of said subpictures with a plurality of bookmark numbers respectively by on screen display.

4. The multimedia player according to claim 1 wherein said multimedia player is one selected from the group consisting of VCD player, SVCD player, CVD player and DVD player.

5. The multimedia player according to claim 1 wherein said decoder is a MPEG decoder.

6. The multimedia player according to claim 1 wherein said image data is a MPEG image data.

* * * * *